(No Model.) 5 Sheets—Sheet 1.
H. P. FISKE.
MACHINE FOR MAKING DECORATIVE NAILS.
No. 388,126. Patented Aug. 21, 1888.
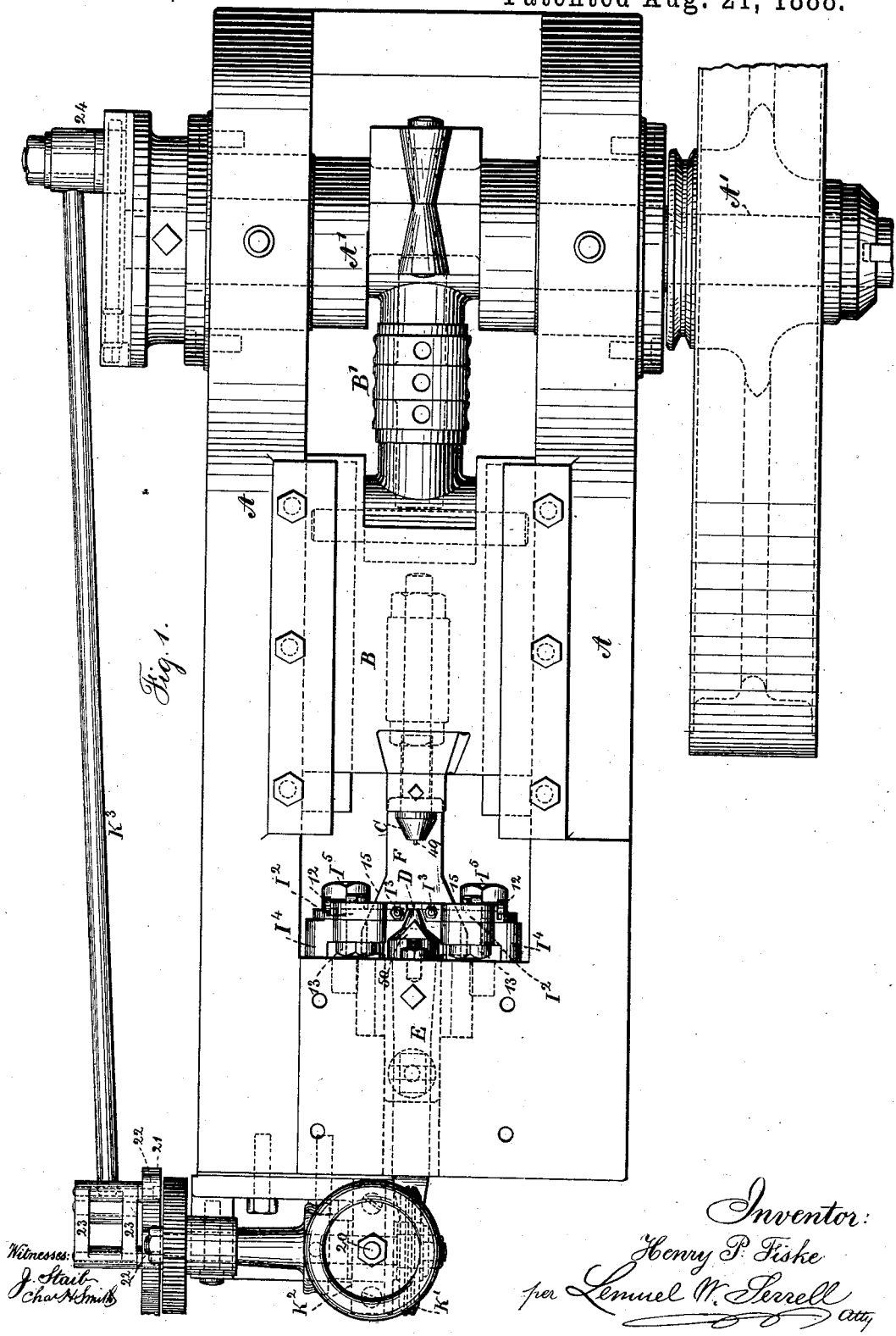
Witnesses:
J. Stait
Chas H. Smith
Inventor:
Henry P. Fiske
per Lemuel W. Serrell
Atty

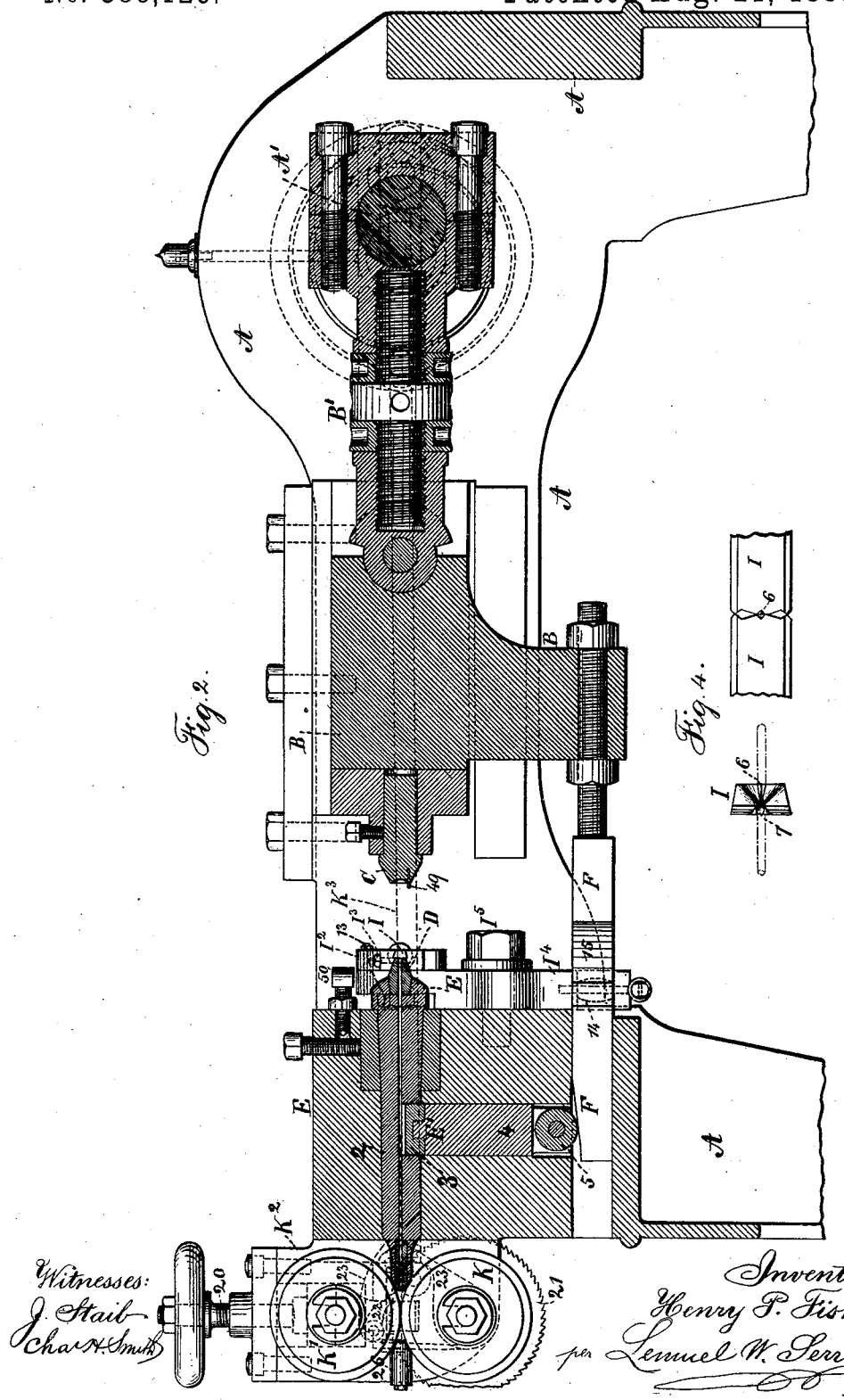

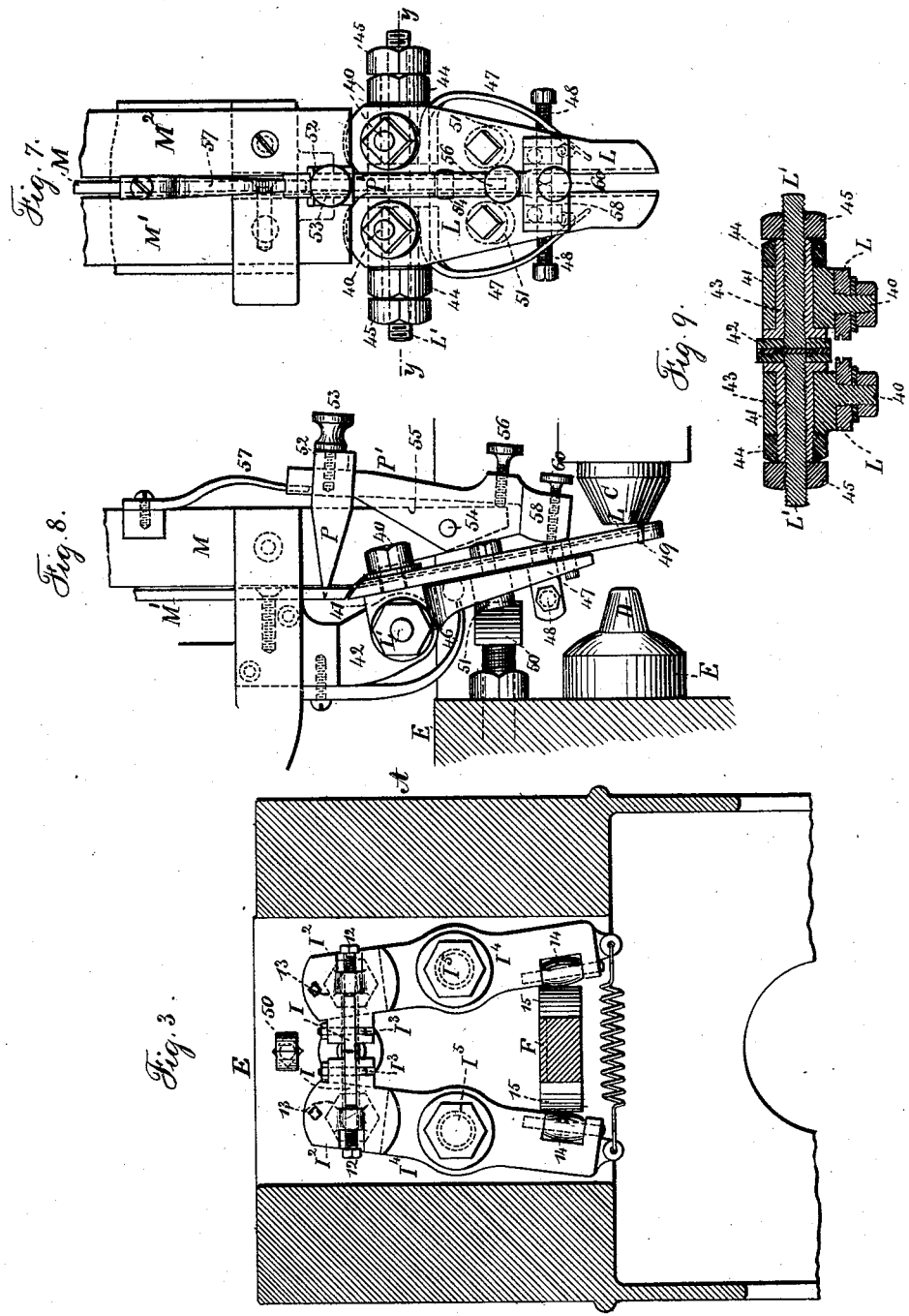

(No Model.) 5 Sheets—Sheet 4.
H. P. FISKE.
MACHINE FOR MAKING DECORATIVE NAILS.
No. 388,126. Patented Aug. 21, 1888.
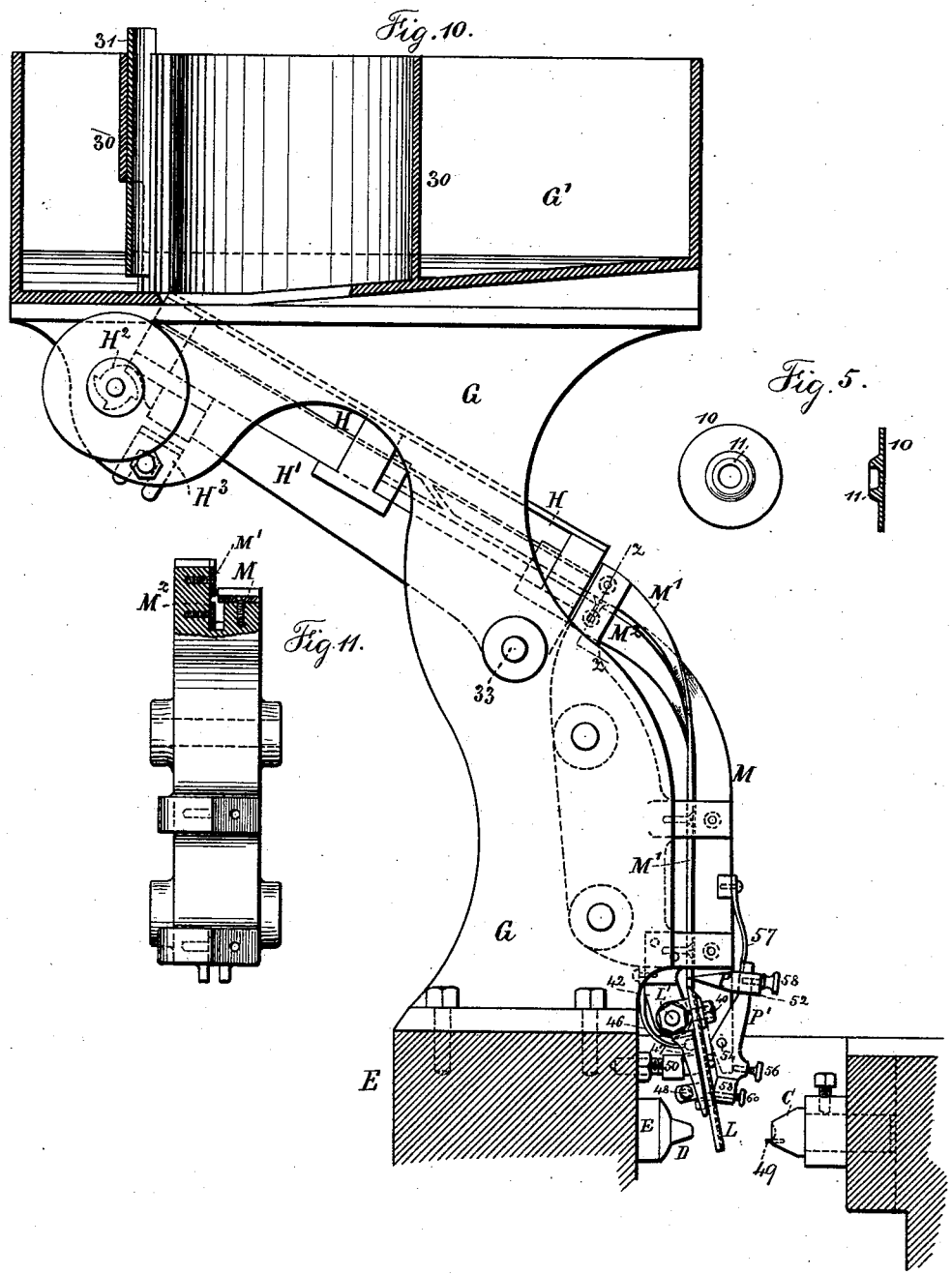

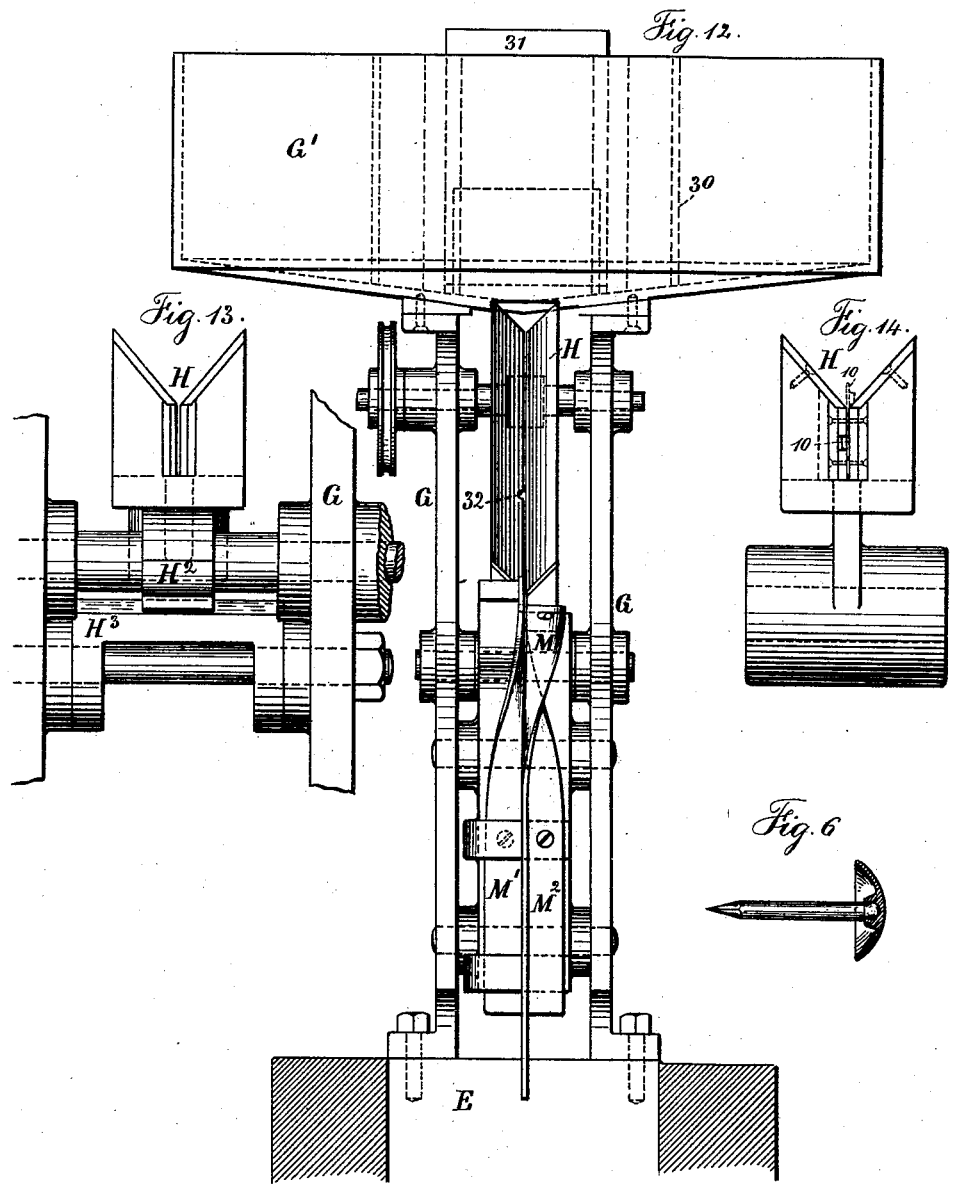

UNITED STATES PATENT OFFICE.

HENRY P. FISKE, OF WATERBURY, CONNECTICUT, ASSIGNOR TO THE AMERICAN RING COMPANY, OF SAME PLACE.

MACHINE FOR MAKING DECORATIVE NAILS.

SPECIFICATION forming part of Letters Patent No. 388,126, dated August 21, 1888.

Application filed September 23, 1887. Serial No. 250,472. (No model.)

*To all whom it may concern:*

Be it known that I, HENRY P. FISKE, of Waterbury, in the county of New Haven and State of Connecticut, have invented an Improvement in Machines for Making Decorative Nails, of which the following is a specification.

Decorative or ornamental nails have been made with a pointed wire shank and a sheet-metal head stamped up into a segmental or conical form; but it has been usual to make the wire nail first and then apply to the same a prepared blank for the head, and then press up the head to shape and simultaneously unite it with the end of the wire. In making nails in this manner the wire nail has to be placed into a holder or die, the blank head laid upon the end of the same, and then the dies are brought together for connecting the head and body of the nail and for shaping the sheet-metal head. In these machines it has been usual to place the wire nail vertically for the sheet-metal head to be applied thereto, and it is difficult to discharge the nail from the machine, because the nail or the nail-head is apt to adhere to the punch, and the attendants are often injured by the action of the devices that press up the sheet-metal head.

In my improvements the wire is fed in automatically. A head or neck is formed at the advancing end of the wire after it passes beyond the heading-dies at the same time that the point of the finished nail is made, so that said finished nail is cut off and entirely free to fall away, and the heading-dies do not require to be made in two parts for discharging the nail. The wire occupies a horizontal position and the sheet-metal blank for the head is fed down at the end of the wire as the head and point forming dies are opened, and then the sheet metal is stamped up to shape and closed around the head upon the wire, after which the wire is fed along the necessary distance, according to the length of the nail, the pointing and heading cutters are forced in upon the wire to cut off the finished nail, and the operations are repeated.

In the drawings, Figure 1 is a plan of the machine without the feeding devices for the head-blanks. Fig. 2 is a vertical longitudinal section of Fig. 1. Fig. 3 is an elevation of the levers and pointing-dies sectionally of the frame. Fig. 4 is an elevation and end view of the cutters in larger size. Fig. 5 is a side view and section, in larger size, of the blank for the nail-head; and Fig. 6 shows the nail and head sectionally as finished. Fig. 7 is an elevation of the swinging fingers and the lower ends of the guide-bars. Fig. 8 is a side view of the parts shown in Fig. 7. Fig. 9 is a sectional plan at the line *y y*, Fig. 7. Fig. 10 is an elevation of the feeding mechanism with the pan in section. Fig. 11 is an elevation of the block and a section of the guide-bars and block at the line *z z*, Fig. 10. Fig. 12 is an elevation of the devices shown in Fig. 10 without the fingers and escapement. Fig. 13 is an elevation at the upper end and Fig. 14 at the lower end of the inclined feed-slides receiving the blanks, these views being taken in line with the slides.

A suitable frame-work, A, is provided, in which is supported a crank-shaft, A', and B is a gate or slide-block that is reciprocated within slides upon the frame A by the pitman or connecting-rod B' and crank of the shaft A'.

C is the die upon the gate B, which die forms the outside of the head, and D is the punch to form the concave side of the head, and this punch is supported by the head-block E upon the frame A. This punch D is hollow or tubular for the passage of the wire forming the nail, and behind the punch and within the head-block E is a clamp, E', to hold the wire after it has been fed along and while the sheet-metal head is being applied to the same. This clamp E' is made of the stationary tubular plug 2 and the jaw 3, the surfaces of which are grooved to correspond to the size of wire made use of. 4 is a lifter with a roller, 5, at the lower end, and F is a cam-bar fastened at the back end to the gate B and reciprocated by it, and an incline or cam upon the top surface of this bar acts upon the roller 5 and lifter 4 to raise the jaw 3 and clamp the wire. This operation takes place shortly after the gate B and die C commence to move toward the head-block E, so that the wire is clamped between 2 and 3 during the time the sheet-metal head is applied thereto, as hereinafter set forth; but upon the reverse movement of the gate B the cam-bar F allows the jaws 2 3 to open, the wire to be fed along the proper distance for the length of the nail, and the previously-headed nail is then cut off and the end of the wire prepared for another head by the cutters I. These cutters I are in two parts, the ends being shaped as represented in larger size in Fig. 4. The portions 6 of the cutters press up the point into a tapering or pyramidal form and cut off the fins, that are thrown out in the usual manner, and the portions 7 of the cutters are recessed, so as to shape the end of the wire nearly globular with a neck sufficient for holding on the sheet-metal head.

I remark that the blanks 10 of sheet metal are in the form heretofore made use of—that is to say, each blank has a central cup, as seen at 11, Fig. 5, and these sheet-metal blanks are prepared in this form before they are supplied to my machine, and when they are fed down, in the manner hereinafter indicated, the die C shapes the outside of the head, and the punch D shapes the inside of the head and at the same time presses the edges of the cup 11 around the neck upon the wire formed by the portions 7 of the cutters, thereby uniting the sheet-metal head to the wire stem or shank of the head simultaneously with the shaping of the said head, and it is to be understood that the shape of the sheet-metal head may vary and that the blank for the sheet-metal head is of the ordinary character, and that the edges of the cup 11 have been closed in around the shank of the nail, but that in nails heretofore made use of the end of the wire has been spread out by an upsetting-die to form a head; but I avoid this operation by the cutters I forming a neck into which the edges of the cup 11 are compressed.

The cutters I are actuated by suitable means. I prefer to make each cutter at the end of a dovetailed piece of steel, which is inserted into a similarly-shaped groove in a cutter-stock, I², which stock is provided with a screw, 12, to set up the cutter endwise in the stock, and the clamping hook-ended bolt I³ serves to bind the cutter firmly within the cutter-stock.

Each cutter-stock has a projecting bolt, 13, passing through the cutter-lever I⁴ and firmly fastened therein by a nut, so that each cutter can be accurately adjusted in relation to the wire upon which it is to operate. The levers I⁴ are pivoted upon the bolts I⁵. At the lower end of each cutter-lever is a roller, 14, and upon the sides of the cam-bar F are inclines 15, that act against said rollers 14, and the positions of these inclines 15 are such that the cutters are brought together to nip off the wire and simultaneously form the point of the finished nail and the neck around the wire for the next head as the gate B is terminating its backward movement. As the gate B again goes forward, the inclines 15 liberate the cutter-levers and they are swung back out of the way by suitable springs.

In order to feed in the wire, I will make use of the rollers K K', supported in a suitable framework, K², and the roller K' is pressed upon the wire by a set-screw, 20, that acts upon the journal-box of the roller-shaft. The rollers K K' are turned the proper distance for feeding the wire by a suitable step-by-step motion. I prefer and use the ratchet-wheel 21 on the shaft of the roller K, and pawls 22 in a pawl-stock, 23, that is vibrated upon the shaft of the roller K by a connecting-rod, K³, to a crank-pin, 24, that is adjustable transversely to the crank-shaft A' in slides provided for that purpose within a disk upon the shaft, so that greater or less length of wire may be fed in for each nail, according to the throw of the crank-pin 24. The wire may pass through a suitable straightener before entering the machine; but usually it is only necessary to provide a tubular guide, 26, in front of the rollers K K'.

I will now describe the manner in which the sheet-metal blanks are selected and fed in properly to the machine.

There is a standard, G, usually supported upon the head-block E, and at the top of this standard is a pan, G', for receiving the blanks for the heads with an inclined or hopper-shaped bottom with an opening therein, and within the pan is a ring or short cylinder, 30, surrounding the opening in the bottom of the pan, and there is an opening at the bottom of the ring, through which the blanks 10 can slide freely; but the gate 31 within the ring 30 can be raised or lowered to vary the size of this opening and regulate the speed with which the blanks 10 pass through and fall in between the sides of the inclined feed-slide H. This feed-slide H is made with two inclined sides and an opening at the bottom between the edges of the inclined sides, which opening is slightly greater than the thickness of the sheet metal of the blank; hence each blank as it falls upon the inclined feed-slide passes down edgewise between the two parts of the slide, but the cup 11 on each blank prevents the blank falling through. Some of the blanks will have the cup 11 standing at one side and others at the other side; but as it is necessary only to use the blanks in which the cups 11 stand in one direction I make a notch at 32 at one side of the slot in the inclined feed-slide, so that the cups 11 as they reach this notch will pass down through the same, and the blanks which stand in the wrong direction will thereby pass out from the inclined feed-slide into any suitable receptacle, to be afterward returned to the pan G'.

The feed-slide H is supported upon a stock, H', pivoted at 33 to the standard G, and the revolving cam H², acting below one end of the feed-slide, gives to the same a vibrating movement sufficient to shake the blanks along in the feed-slide, and thereby insure their proper feeding movement.

I prefer to make use of a stop, H³, with an upper surface of rubber, which stop H³ is adjustably bolted to the standard G, so that it may be raised or lowered and regulate the distance that the stock H' falls after being lifted by each tooth of the revolving cam H², and in this manner the agitation can be regulated for feeding the blanks at the proper speed.

From the lower end of the inclined feed-slide H the blank is conveyed to the fingers L by the guide-bars M M' M². These guide-bars occupy the relative positions shown in Fig. 11, so as to receive between the edges of the bars M' M² the cup upon the center of the head-blank, and the bar M comes at the other side of the head-blank opposite the center thereof. In cases where the pan G' is placed over the head-block E these guide-bars M M' M² are twisted, so as to turn the blank around into the desired position for entering between the fingers L; but if the pan G' is placed off at one side the guide-bars M M' M² can be inclined or curved to bring the blanks down in a regular plane to the upper ends of the fingers L. These fingers L are made in the form of thin bars grooved on their adjacent edges, so that the blank between them can slide down in the grooves; but it is important to be able to adjust the distance between the fingers to suit blanks of different diameters, to open the fingers as the blank is received by the die and punch, and to allow these fingers to swing longitudinally of the machine as the die is moved in striking up the head. With these objects in view the fingers L are connected by gudgeon-bolts 40 to the tubular stocks 41, through which stocks the stationary axis L' passes, which axis is supported by a central hanger-plate, 42, from the frame supporting the lower ends of the guide-bars M M' M². This stationary axis L' is screw-threaded and receives upon it the screw-sleeves 43, that are within the tubular stocks 41, and such screw-sleeves are provided with collars and lock-nuts 44 against the ends of the tubular stocks, so that by revolving the screw-sleeves around the stationary axis L' the guide-fingers L can be separated or brought nearer together, and after being so adjusted the sleeves 43 are clamped in place by the lock-nuts 45, screwed upon such stationary axis L', and the guide-fingers L can be swung upon the gudgeon-bolts 40 to open or close such guide-fingers, and the guide-fingers can be swung longitudinally of the machine, the tubular stocks 41 turning freely upon the screw-sleeves 43. The spring 46 tends to swing the fingers L toward the die C, and the springs 47 tend to close the fingers together; but the stop-screws 48, that pass through lugs at the back of the fingers, limit the closing movement and keep the fingers sufficiently far apart for a blank, 10, to slide down freely within the contiguous grooves of such fingers, and there is a stop-pin, 49, projecting from the face of the die C and passing in between the fingers L, so that the blank 10 will rest upon such stop-pin and be in the proper position in front of the concave die C, in order that when said die C is moved toward the punch D the blank 10 will be properly struck up to form the head by the action of the die and punch, as before described. It is, however, necessary to spread the fingers L apart as the die and punch come together, so that the punch will not injure the fingers. To effect this object, I place upon the punch-stock or upon the face of the head-block E a double incline, 50, with a screw-stem passing into the head-block, so as to adjust the position of the double incline, and upon the backs of the fingers L are studs 51, which come against the inclined sides 50 as the fingers are swung longitudinally by the movement of the gate B and die C, so that such double incline 50, acting upon the studs 51, opens the fingers L just sufficiently to clear the punch D as the swinging movement takes place.

I make use of the swinging movement of the fingers L to actuate an escapement that permits one blank at a time to drop from the guide-bars M M' M² in between said fingers L. When the fingers L hang perpendicular, the grooves in their adjacent edges do not coincide with the space between the guide-bars M M' M²; hence a blank cannot drop from M M' M² into L until the fingers L are swung from a vertical into an inclined position. I therefore make use of an escapement which allows the lower blank between the guide-bars M M' M² to rest upon the top ends of the fingers L when said fingers L are vertical, and I move the escapement so as to pass prongs P in between the lower blank and the next one above it before the swinging movement of the fingers L longitudinally of the machine causes the grooves in L to coincide with the spaces between M' M², so that such prongs P support the blanks that are between M M' M² above the bottom one and allow said bottom blank to slide down in the grooves of said fingers L.

The prongs P are in the form of pointed plates, united by a head-piece, 52, that is slotted for the screw 53, that passes into the escapement-lever P', and this lever P' is pivoted at 54 upon the lower end, 55, of the bar M, that extends below the lower ends of the guide-bars M' M², and there is a regulating-screw, 56, passing through the escapement-lever P' and acting against the edge of the plate 55 to limit the swinging movement given by the spring 57 to the escapement-lever P', and there is a cross-head, 58, to the lower end of the escapement-lever P', so that the fingers L as they are swung by the action of the spring 46 press against this head 58 and overcome the spring 57, which is very light, and move the escapement-lever P' as the gate B and die C draw back. During this movement the prongs P are first projected in between the edges of the guide-bars M M' M² above the lowest blank 10, and in so doing all the blanks above the prongs are sustained, and the lowest blank drops in between the grooved edges of the fingers L as soon as the grooves therein coincide with the grooves in the guide-bars M M' M², and I make use of a screw, 60, passing through the cross-head 58 and in between the fingers L, so that the blank stops above this screw 60, while the die C may draw back more or less, and when the die C comes forward again, and by pressing against the fingers swings them longitudinally, the said fingers are moved away from the screw 60 and the blank drops down and rests upon the pin 49. During this movement the spring 57 has swung the escapement-lever P' and drawn back the prongs P, the extent of movement being determined by the regulating-screw 56. This movement need only be sufficient for drawing the prongs P out of the way of the blanks between the guide-bars M M' M², so that such blanks will slide down and the lowest one rest upon the upper ends of the fingers L. The slot in the head 52 for the screw 53 allows the prongs P to be raised or lowered, and thereby adapted to different diameters of blanks.

The supports for the guide-bars M M' M² are adjustable, so that said guide-bars may be moved from or toward each other to accommodate different sizes of blanks.

I do not claim a machine such as shown in German Patent No. 39,526, in which the wire is separated by cutters acting upon the wire while the same is within the tubular punch, because such punch has to be made in two parts to be opened for the delivery of the finished nail. By passing the wire along and projecting it beyond the tubular die before it is cut the nail falls away, and also the small pieces of metal cut by the dies in forming the point.

I claim as my invention—

1. The combination, in a machine for making decorative nails, of a reciprocating gate and die, a tubular punch acting with the die to shape the sheet-metal head and close the metal around the end of the wire-nail shank, means for feeding the wire through the tubular punch, and cutters acting outside of and beyond the tubular punch for forming the point of the nail and separating the completed nail from the wire and forming the neck of the next nail-head, substantially as set forth.

2. The combination, in a decorative-nail machine, of grooved fingers between which the sheet-metal blank is supplied, a tubular punch and die for shaping the sheet-metal head, horizontally-actuated mechanism for moving the die, feeding mechanism for supplying the wire through the tubular punch, and cutters acting outside the tubular die for cutting off the finished nail and simultaneously forming the point and preparing the neck or head portion for the next nail, substantially as set forth.

3. In a machine for making decorative nails, the combination, with the die and tubular punch, of means for feeding the wire and cutters constructed as specified and acting outside of the tubular die for simultaneously separating the finished nail from the wire, forming the point thereof and a neck or head at the end of the wire for the next nail, substantially as set forth.

4. The combination, with the die and punch for forming the sheet-metal head and mechanism for reciprocating the die, of fingers grooved to receive the edges of the sheet-metal blank head and pivots for the fingers, upon which they can swing and open laterally to clear the dies when forming the sheet-metal head, substantially as specified.

5. The combination, with the punch and die for forming sheet-metal nail-heads, of grooved fingers for holding the sheet-metal head-blank, pivots upon which the fingers swing in opening laterally to clear the die, and pivots upon which the fingers swing longitudinally of the machine as the die moves in forming up the sheet-metal head, substantially as set forth.

6. The combination, with the die and punch, of the fingers L, the gudgeon-bolts 40, and tubular stocks 41, forming pivots for the fingers, the stationary axis L', and the adjusting-nuts, substantially as set forth.

7. The combination, with the pivoted swinging fingers and the springs for closing the same, of the dies for shaping the sheet-metal head and the incline 50, for opening the fingers as the parts are moved, substantially as set forth.

8. The combination, in a machine for making decorative nails, of an inclined feed-slide having a slot at the bottom and an opening at one side of the slot that allows the sheet-metal blank that is in proper position for the head-forming dies to pass away to the fingers and to separate from the blanks that are not in the proper position, substantially as set forth.

9. The combination, with the fingers for receiving and supplying the blank and the head-forming dies, of a slide through which the blanks are supplied and an automatic escapement mechanism, substantially as described, for allowing one blank at a time to pass from the slide to the fingers and thence to the dies, substantially as set forth.

10. The feeding pan having an opening in the bottom and a ring, 30, and adjustable gate 31, in combination with the feed-slide H, for receiving the nail-head blanks, and the guide-bars for conveying the blanks to the heading mechanism, substantially as specified.

11. The combination, with the guide-bars for conveying the head-blanks and the dies for pressing up said blanks, of the escapement-lever P', having the prongs P for holding up the blanks between the guide-bars, and the swinging fingers slotted to receive the edges of the blanks, substantially as set forth.

12. The combination, with the dies for pressing up the nail-head, of the guide-bars for the blank heads, swinging fingers below the guide-bars for receiving the blanks and holding them on line with the dies, an escapement-lever to allow one blank at a time to pass down to the fingers, and a stop-pin on the escapement-lever for holding up the blank, substantially as specified.

13. The combination, in a machine for making nails with ornamental sheet-metal heads, of dies for closing the cup of the sheet-metal head around the neck in the end of the wire, feeding mechanism, substantially as set forth, for feeding along the wire, and dies for cutting off and pointing the complete nail and simultaneously forming the neck for the next nail, substantially as set forth.

Signed by me this 1st day of September, A. D. 1887.

HENRY P. FISKE.

Witnesses:
WILLIAM G. MOTT,
HAROLD SERRELL.